(12) United States Patent
Scharl

(10) Patent No.: US 6,394,864 B2
(45) Date of Patent: May 28, 2002

(54) COMPOSITE BODIES, IN PARTICULAR SAILING OR SURFBOARDS

(75) Inventor: Thomas Scharl, Micheldorf (AT)

(73) Assignee: Boards & More Ges. m.b.H., Molln (AT)

( * ) Notice: Subject to any disclaimer, the term of this patent is extended or adjusted under 35 U.S.C. 154(b) by 0 days.

(21) Appl. No.: 09/766,146

(22) Filed: Jan. 19, 2001

(30) Foreign Application Priority Data

Jan. 19, 2000 (DE) .......................... 100 02 185

(51) Int. Cl.[7] .......................... B63B 1/00; B63B 35/79; B63B 5/24
(52) U.S. Cl. .......................... 441/65; 441/74; 114/357
(58) Field of Search .......................... 441/65, 74; 114/355, 114/357

(56) References Cited

U.S. PATENT DOCUMENTS

| | | | | |
|---|---|---|---|---|
| D183,016 S | * | 6/1958 | O'Herron .................. D21/769 |
| 3,544,417 A | * | 12/1970 | Corzine .................. 428/104 |
| 3,591,443 A | * | 7/1971 | Cox .................. 428/47 |
| 3,738,675 A | * | 6/1973 | Hashimoto .................. 280/11.13 L |
| 3,867,238 A | * | 2/1975 | Johannsen .................. 161/37 |
| 3,918,114 A | * | 11/1975 | Schmitt .................. 9/310 R |
| 4,032,689 A | * | 6/1977 | Johnson et al. .................. 428/55 |
| 4,135,732 A | * | 1/1979 | Magnus .................. 280/610 |
| 4,705,291 A | * | 11/1987 | Gauer .................. 280/609 |
| 5,114,370 A | * | 5/1992 | Moran .................. 441/65 |
| 5,224,890 A | * | 7/1993 | Moran .................. 441/65 |
| 5,238,434 A | * | 8/1993 | Moran .................. 441/74 |
| 5,766,051 A | * | 6/1998 | Messer .................. 441/65 |
| D446,273 S | * | 8/2001 | Natale .................. D21/769 |

FOREIGN PATENT DOCUMENTS

| | | | | |
|---|---|---|---|---|
| CA | 696148 | * | 10/1964 | .................. 114/357 |
| FR | 2534188 | * | 4/1984 | .................. 441/74 |
| GB | 2048174 | * | 12/1980 | .................. 114/357 |
| JP | 55-106881 | * | 8/1980 | .................. 114/357 |
| JP | 63-051877 | * | 3/1988 | .................. 441/74 |
| JP | 63-0542221 | * | 3/1988 | .................. 441/74 |
| JP | 03-182896 | * | 8/1991 | .................. 441/74 |

* cited by examiner

Primary Examiner—S. Joseph Morano
Assistant Examiner—Ajay Vasudeva
(74) Attorney, Agent, or Firm—Senniger, Powers, Leavitt & Roedel

(57) ABSTRACT

A sailing or wave-riding board includes a foam core, a support layer, and a cover layer. The board has a number of incisions at least in portions of the surface of the support layer. The incisions increase the bending capacity of the support layer so that it can also be adapted to the contour in more curved areas of the foam core, in particular in a boundary area.

6 Claims, 2 Drawing Sheets

COMPOSITE BODIES, IN PARTICULAR SAILING OR SURFBOARDS

BACKGROUND OF THE INVENTION

The invention under consideration concerns a composite body, in particular a sailing or surfboard.

A surfboard is known from EP 0 064 937 A2, which is produced in the so-called "two-shell mode of construction." Here, a knit fabric is first applied on a core made of expanded polystyrene (EPS core). Subsequently, a foaming adhesive mass is applied extensively on the core. The core is then inserted between two preformed shell parts, which are either cemented on their joint or with the supply of heat and pressure, are soldered to one another in a production mold.

From EP 0 069 076, a method is known for the production of a composite body with a plastic-hard foam core and a support layer. The production of the composite body takes place with a two-part casting mold, wherein in a first step, the two casting mold parts are lined with a film, which later forms the surface of the composite body. After pouring in a viscous composition, which forms the support layer of the composite body, the hard foam core is inserted and the mold is closed. Then, the foaming and curing of the support layer take place and subsequently, the finished composite body is released from the mold.

Traditional surfboards, manufactured in series, frequently have a so-called "sandwich structure," in which hard foam plates made of plastic (for example, foamed PVC), which are clearly sturdier than the foam core and serve as the "support layer," are cemented on the underside and the upper side of a foam core made of expanded polystyrene. These hard foam plates, however, can be shaped only to a limited extent. In the boundary area of the foam core, which is curved substantially more than the upper side or underside, the hard foam plates are therefore cut off, since their elasticity is not sufficient for the shaping required here. Such a strong shaping would be possible with a supply of thermal energy, which, however, is very labor-intensive and expensive. For the reinforcement of the boundary area, therefore, the gap between the foam core, a cover film, and the joint edges of the upper and lower hard foam plate is laminated with glass-fiber cloth and resin in the thickness of the hard foam plates or filled out with plastic, such as epoxy resin. The "unfinished surfboard part" is coated with a watertight surface skin (for example, made of acrylic rubber-styrene-acrylonitrile copolymer (ASA)). The relatively thick lamination or plastic filling in the boundary area of the surfboard, however, increases the weight and is technically, a weak site.

SUMMARY OF THE INVENTION

The goal of the invention under consideration is to create a composite body, in particular a surfboard or a wave-riding board, which, with a simple production, is characterized by a low weight and a high strength.

The basic principle of the invention is to be found in providing the support layer, to be applied on a foam core, with a number of incisions or notches, at least in partial areas of its surface. By means of the incisions or notches, the bending capacity of the support layer is increased, so that it can also be adapted to the contour of the foam core in the more curved areas of the composite body, especially in the boundary area. This makes possible a completely closed sandwich structure with a low weight. The closed structure further increases the rigidity, the breaking resistance, and the service life of the composite body.

Preferably, the incisions or notches are provided on the outside—that is, on the side turned away from the foam core—of the support layer, so that upon bending the support layer, the incisions open fan-like or notch-like.

As a support layer, a hard foam plate, for example, can be used, which can be easily shaped by making incisions or notches in accordance with the contour of the foam core. For the upper side and the underside, a separate hard foam plate will be used as the support layer, which is cemented in the boundary area of the surfboard, joint to joint, with one another. For the production of a seamless transition, the joint area can be over-laminated with overlapping cloth, for example, a glass-fiber cloth.

On the surface of the unfinished part thus obtained, foaming resin is applied, for example, by spraying. In a known manner, the still "wet" unfinished part is placed into a two-part production mold, prepared beforehand, into whose mold halves, the surface skin (the so-called ASA layer) is introduced, and subsequently, it is pressed to form a finished surfboard in one single operation.

BRIEF DESCRIPTION OF THE DRAWINGS

The invention is explained in more detail with the aid of an embodiment in connection with the drawings. The figures show the following.

Corresponding reference characters indicate corresponding parts throughout the several views of the drawings.

DETAILED DESCRIPTION OF THE PREFERRED EMBODIMENT

Figure 1:
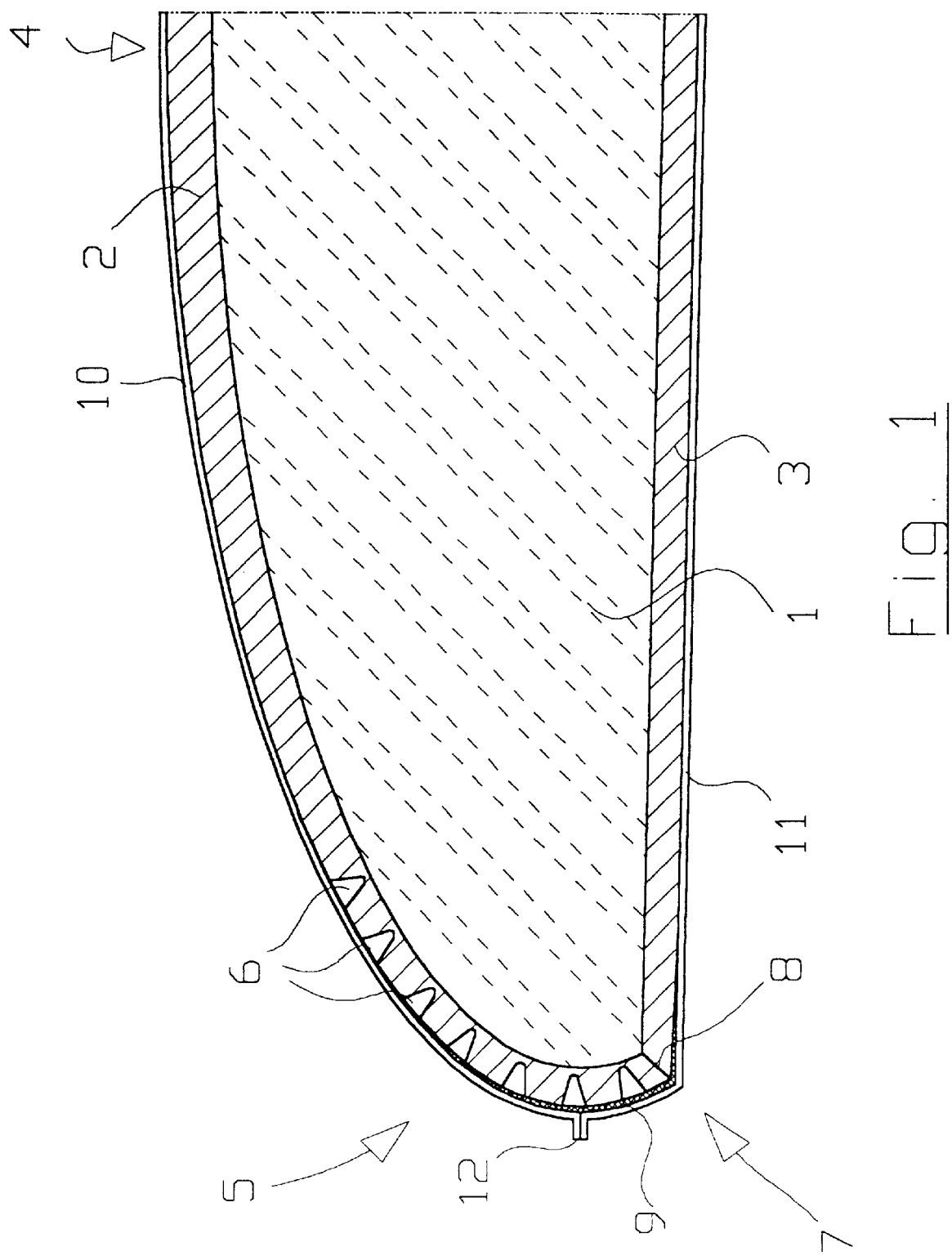
FIG. 1 is a cross-section through the body of a surfboard according to the invention.

FIG. 1 shows a cross-section through half of the body of a surfboard. The surfboard has a foam core 1, which is made of, for example, expanded polystyrene (EPS). A support layer is cemented onto the foam core 1; the layer consists of an upper support layer half 2 and a lower support layer half 3. The support layer halves 2, 3 can be produced, for example, from hard foam plates.

One can clearly see that the curvature of the surfboard increases from the middle area 4 to the boundary area 5. The hard foam plate, which forms the upper support layer 2 here, is therefore provided with a number of incisions 6 before the cementing or shaping in the boundary area 5, wherein the bending capacity of the upper support layer 2 is increased. The support layer 2 is then cemented in such a way that the incisions 6 lie on the outside—that is, on the side turned away from the foam core 1. By shaping the support layer 2 during the cementing on the foam core 1, the incisions 6 are turned upward so that the notch-like recesses, shown in FIG. 1, are produced.

The upper support layer 2 is moved downwards to a "lower edge" 7 of the surfboard body and there cemented on an joint site 8 with the lower support layer 3. The joint site 8 is optionally over-laminated with a resin-soaked glass-fiber layer 9, which extends in the boundary area 5 upwards and to the lower side of the surfboard—that is, covers the joint site 8 and some or all notches 6. The notch-like incisions 6 can be filled with resin beforehand.

Foaming or nonfoaming resin, such as epoxy or polyurethane, is applied, for example, by spraying onto the unfinished surfboard thus obtained. In a known manner, a watertight surface layer (ASA layer) is then applied, which is formed here from an upper surface layer 10 and a lower surface layer 11, which are cemented or soldered watertight, to one another, in the boundary area 5 of the surfboard on a joint site 12. This manufacturing step is carried out with a two-part mold (not shown), wherein the upper and the lower surface layers 10 or 11 are introduced into assigned mold halves. Subsequently, the unfinished part is placed in the mold and the mold halves are closed. At a prespecified temperature, the surfboard is "baked," wherein the adhesive or the resin between the foam core 1 and the support layer 2,3 or between the support layer 2,3 and the surface layer 10,11 is cured.

In this way, a completely closed, homogeneous, sandwich-like structure is produced in a so-called monocoque mode of construction, which, in comparison to the initially mentioned, traditional structure, has a lower weight, a higher rigidity, a higher breaking resistance, and a longer service life.

Figure 2:
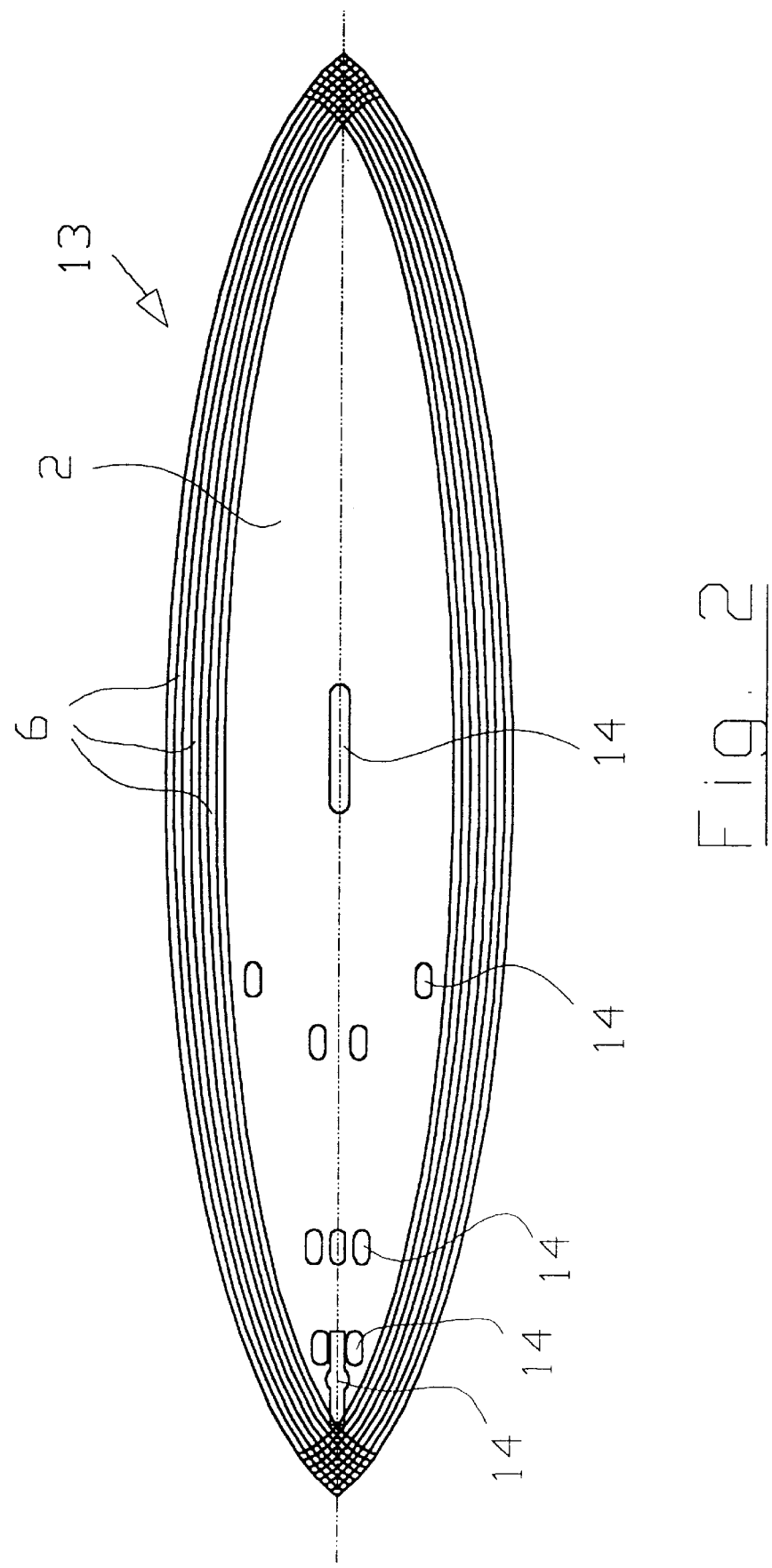
FIG. 2 is a top view of an unfinished surfboard body in accordance with the invention.

FIG. 2 shows a top view of the upper hard foam plate 2 of the body of a surfboard. One can see the incisions 6 in the boundary area of the body of the surfboard; they cross in the tip and end areas, so that the hard foam plate is particularly flexible there and is adapted also to the greater curvature present there in the longitudinal direction of the body of the surfboard. Furthermore, more recesses 14 are provided for the fin, the centerboard, and the foot loops and other incorporated parts.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A sailing or wave-riding board with a foam core on which a support layer made of plastic is applied and a surface layer is applied on the support layer, the support layer having a number of incisions at least in portions of its surface, the board being completely enclosed by the support layer, the support layer being formed by an upper support layer and a lower support layer, and a joint edge between the upper support layer and the lower support layer being over-laminated with a resin-soaked cloth.

2. A board as set forth in claim 1 wherein the incisions are provided in a boundary area of the board.

3. A board as set forth in claim 1 wherein the incisions are provided on a side of the support layer opposite the foam core.

4. A board as set forth in claim 3 wherein the incisions are provided in a boundary area of the board.

5. A board as set forth in claim 1 wherein the upper support layer and the lower support layer are cemented to one another at the joint edge.

6. A board as set forth in claim 1 wherein the incisions are over-laminated with a resin-soaked cloth.

* * * * *